United States Patent [19]

Sogabe et al.

[11] 4,088,285
[45] May 9, 1978

[54] MOTOR-GLIDER

[75] Inventors: Itsushi Sogabe; Kiyoshi Souda, both of Yokohama, Japan

[73] Assignee: Japan Aircraft Manufacturing Co., Inc., Japan

[21] Appl. No.: 723,557

[22] Filed: Sep. 15, 1976

[51] Int. Cl.² .................. B64C 31/02; B64D 41/00
[52] U.S. Cl. .................................. 244/16; 244/58
[58] Field of Search .......... 244/16, 54, 55, 58, 244/12.3, 53 B, 53 R, 65, 67; 416/179, 189

[56] References Cited

U.S. PATENT DOCUMENTS

| | | | |
|---|---|---|---|
| 3,129,910 | 4/1964 | Smith | 244/53 B X |
| 3,563,500 | 2/1971 | Fischer | 244/16 X |
| 3,580,530 | 5/1971 | Wada et al. | 244/12.3 |
| 3,592,416 | 7/1971 | Rikus | 244/12.3 |

OTHER PUBLICATIONS

*Jane's All the World's Aircraft* 1969-1970, Ed. by J. W. R. Taylor, 8/1970, pp. 542-543 (see Caproni-Vizzola A21J).
*Aircraft Engineering*, Nov. 1964, p. 369.
*Jane's All the World's Aircraft* 1972-1973, Ed. by J. W. R. Taylor 5/1973, p. 520 (See RFB Sirius) pp. 532-533 (see Caproni-Vizzola A21J).
*Jane's All the World's Aircraft* 1971-1972, Ed. by J. W. R. Taylor 1/1972, pp. 507-508 (see Caproni-Vizzola A21J).

*Primary Examiner*—Barry L. Kelmachter
*Attorney, Agent, or Firm*—Ostrolenk, Faber, Gerb & Soffen

[57] ABSTRACT

In a motor-glider provided with a propeller power system fully encased within the fuselage thereof, outer shapes of the elements adapted for selectively closing air-intakes and, when required, an outlet are designed quite flush with the streamlined shapes of the surrounding portions of the motor-glider and the air is ejected in directions away from the tail boom, whereby aerodynamic drag acting on the motor-glider during power-off gliding is considerably minimized.

12 Claims, 15 Drawing Figures

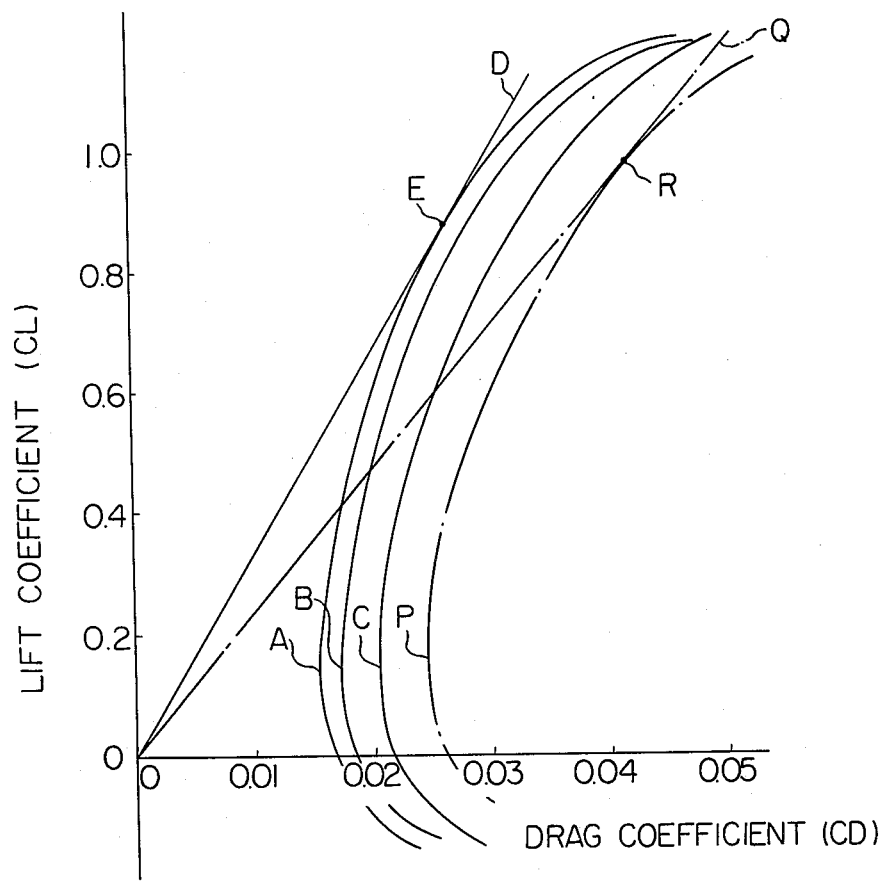

MOTOR-GLIDER

BACKGROUND OF THE INVENTION

The present invention relates to an improved motor-glider, and more particularly relates to an improved construction of a glider which is driven for powered flight and take-off by a motorcycle engine and performs power-off gliding with the motorcycle engine being off.

As is well known, gliders are in general roughly classified into three categories, i.e. primary gliders, secondary gliders and high performance gliders. Among others, the high performance gliders, which are also known as soarers, have special aerodynamic characteristics of an extremely high level. The gliders of this category are particularly suited for long distance soaring over a long period of time being carried on the thermals which are usually developed by wind passing over coast slopes, mountain slopes and cliffs, or on thermals developed under cumulonimbi, or on hot thermals developed over big cities and deserts.

In order that a high performance glider should successfuly rise to a level suited for such long distance soaring, it is necessary to tow the glider by an aircraft. In order to attain the level at a training airport ground, it is necessary to tow the glider by an automobile or any other towing equipment such as an winch.

In the hope of avoiding the necessity for such troublesome towing operation, gliders equipped with internal combustion engines, i.e. the so-called motor-gliders, have been lately proposed in the field of this industry and some of the proposed motor-gliders have already been available in the market.

One of the conventional motor-gliders is provided with a propeller power system mounted to the nose cone of the fuselage. However, presence of such a propeller power system at the nose cone of the fuselage more or less detracts from the streamlined outer shape of the glider and tends to cause increased aerodynamic drag on the glider during power-off gliding.

In another one of the conventional motor-gliders, the propeller power system is arranged atop a support which projects above the top of the fuselage during power drive and can be overturned for retraction into the fuselage, just like the retractable landing system, during periods of power-off gliding. Change in the position of the propeller power system, which in general occupys a relatively large share of the total weight of the glider of light construction, naturally causes a corresponding change in the center of gravity of the glider. Such a change in the center of gravity tends to pose significant stability problem regarding the posture of the glider just as power-off gliding is initiated, i.e. during flight without any positive control. In addition, inevitable presence of a gap between the propeller thrust line and the longitudinal axis of the glider amounting to about 1 meter have a delicate, harmful influence upon the glide characteristics of the glider.

Further, in both of the aforementioned types of gliders, the turbulent air generated by motion of the propeller power system flows towards the trailing portion of the glider almost fully shrouding the tail boom and its related parts, thereby applying undesirable aerodynamic drag to the glider.

OBJECTS OF THE INVENTION

It is the principal object of the present invention to provide a motor-glider having enhanced gliding characteristics.

It is another object of the present invention to provide a motor-glider whose elements which are operative during powered flight and take-off are all encased within the fuselage during power-off gliding without in any way affecting the streamlined outer shape of the motor-glider.

It is another object of the present invention to provide a motor-glider which experiences no change in the center of gravity due to a changeover between powered flight and power-off gliding.

It is a further object of the present invention to provide a motor-glider whose propeller thrust line is substantially in line with the longitudinal axis of the motor-glider.

It is a further object of the present invention to provide a motor-glider whose posture is very stable during power-off gliding.

It is a further object of the present invention to provide a motor-glider which is free of any aerodynamic drag caused by turbulent air generated by the propeller power system.

BRIEF DESCRIPTION OF THE INVENTION

In accordance with the basic aspect of the present invention, the motor-glider is provided with a propeller power system fully encased within a chamber formed in the rearward bottom portion of the fuselage. Air-intakes are located on both sides of the fuselage and open into the chamber. Movable shutters are annexed to the air-intake in order to selectively open or close the same, whose outer surfaces in the closed state are flush with the streamlined outer surface of the fuselage. An outlet opening is formed in the rear end of the fuselage in communication with the chamber.

In a preferred embodiment of the present invention, the propeller power system is located at a position close to the center of gravity of the motor-glider.

In another preferred embodiment of the present invention, the shutters are of a Venetian blind type and their hinge lines extend substantially parallel to the longitudinal axis of the motor-glider.

In another preferred embodiment of the present invention, the outlet open rearwardly and downwardly.

In a further preferred embodiment of the present invention, additional means are provided for selectively closing the outlet.

BRIEF DESCRIPTION OF THE FIGURES

Further features and advantages of the present invention will be made clearer from the ensuing description, reference being made to the embodiment shown in the accompanying drawings in which;

FIG. 11 shows a family of curves useful in the advantages of the present invention.

DETAILED DESCRIPTION OF THE INVENTION

Figure 1:
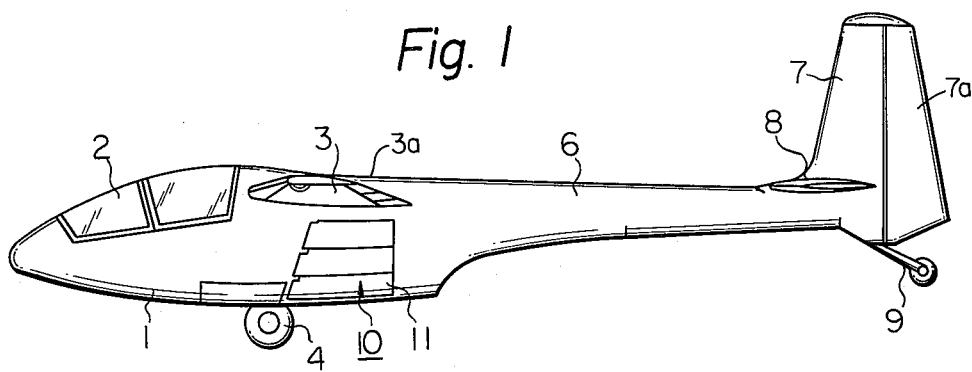
FIG. 1 is a side elevational view of an embodiment of the motor-glider in accordance with the present invention.
Figure 2:
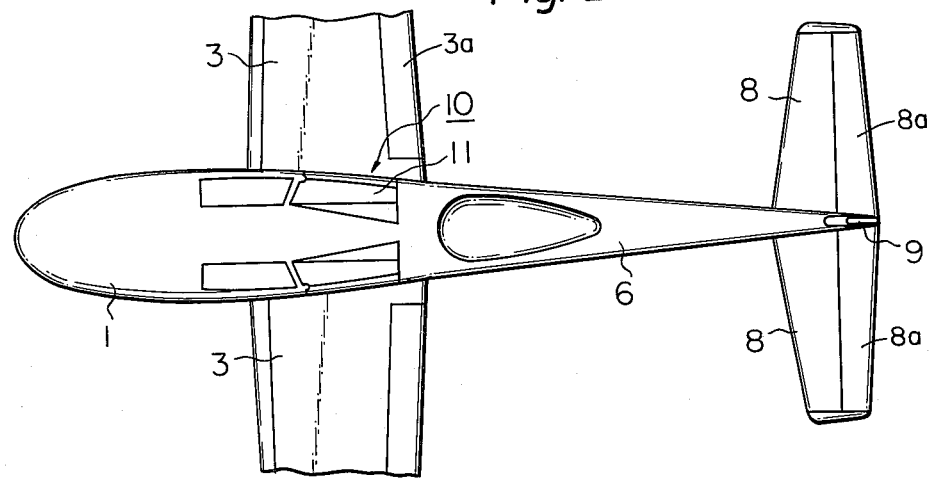
FIG. 2 is a bottom plan view, with parts of the wings omitted, of the motor-glider shown in FIG. 1.

A basic embodiment of the motor-glider in accordance with the present invention is shown in FIGS. 1 through 4, in which, like most conventional motor-gliders, the motor glider is comprised of a fuselage 1 having a cockpit 2 formed in its upper leading portion, wings 3 of a single-spar structure with trailing edge flaps 3a, each in two sections, that also function as air brakes, a two-leg landing gear system 4 with both main wheels fully retractable into the bottom portion of the fuselage 1, a tail boom 6 extending rearwardly and integrally joined to the fuselage 1 forming a unitary body, a vertical tail 7 with rudder 7a and horizontal tails 8 with elevators 8a, both provided on the trailing edge of the tail boom 6. A conventional tailwheel 9 is provided on the bottom of the vertical tail 7. The above-described elements are all designed in streamline shapes in order to minimize the aerodynamic drag acting on the motor-glider during both powered flight and power-off gliding.

In accordance with the present invention, the motor-glider is further provided with air intakes 10 located on both sides of the fuselage 1 each consisting of Venetian-blind-type shutters 11 which, as later described, can be closed for power-off gliding. The shutters 11 are hinged to the framework of the fuselage 1 in any known suitable manner, the hinge lines extending substantially parallel to the longitudinal axis of the motor-glider. About at the border region between the fuselage 1 and the tail boom 6, the trailing bottom of the fuselage 1 is scooped for providing an outlet 12 which always opens downwardly and rearwardly.

Figure 3:
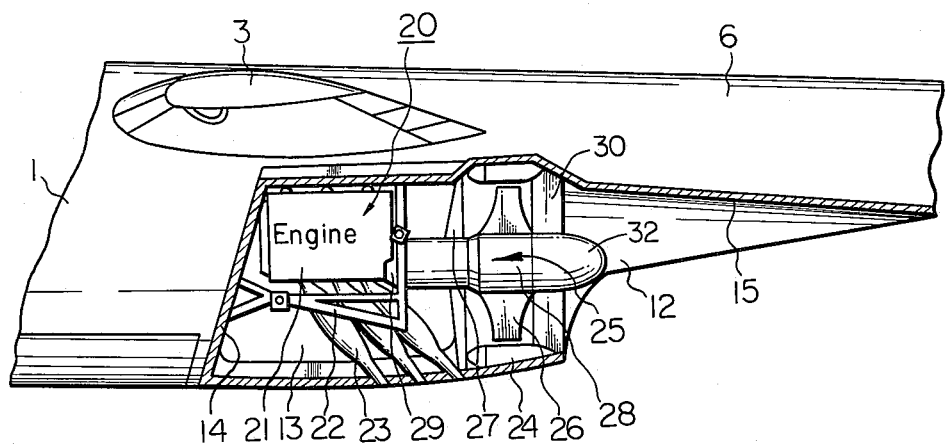
FIG. 3 is an enlarged, partly sectional side elevational view of the propeller power system usable for the motor-glider shown in FIG. 1.
Figure 4:
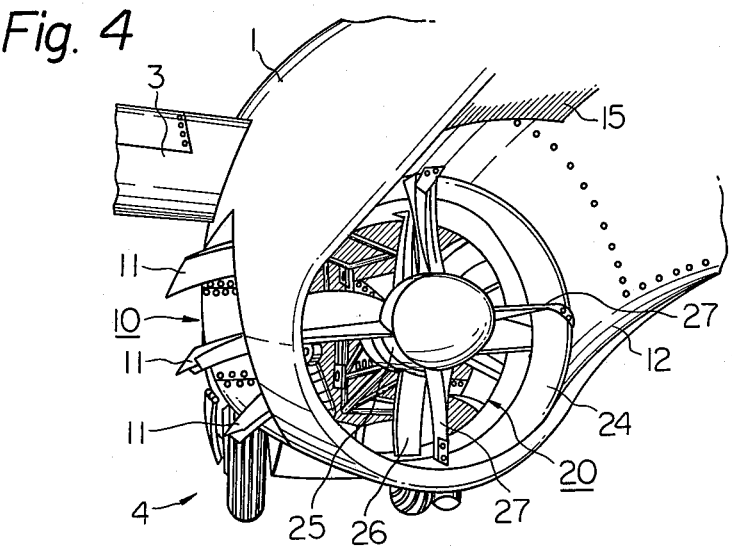
FIG. 4 is a rear perspective view of the propeller power system and its related parts shown in FIG. 3.

As well seen in FIGS. 3 and 4, a chamber 13 is formed in the trailing bottom portion of the fuselage 1, the chamber 13 being defined by the outer wall of the fuselage 1, a bulkhead 14 and an elongated top duct board 15. This chamber 13 is in direct communication with surroundings of the motor-glider via the air-intake 10 in, the open state of the shutters 11 and the outlet 12 and is adapted for encasing the power-system 20 described below. An internal combustion engine 21 of a relatively compact type is fixedly carried by support frames 22 fixed within the chamber 13 in any known manner, exhaust pipes 23 thereof each extending rearwardly to and communicating with an opening in the bottom of the fuselage 1. At a position somewhat rearwardly of the engine 21 and close to the outlet 12, there is a supporting cylinder 24 which is fixed to the walls defining the chamber 13 with its center axis being parallel to the longitudnal axis of the motor-glider. A ducted propeller fan 25 having a plurality of blades 26, preferably four or more sets of blades 26, is coaxially supported in the cylinder 24 via struts 27 fixed at their outer ends to the inner periphery of the cylinder 24. The boss 28 of the blades 26 has its forward end coupled to the engine 21 via suitable flexible couplings 29 and is driven thereby for rotation. The boss 28 is coupled rearwardly to a tail cone 32 facing the outlet 12 and supported by the wall via stators 30. The power system 20 is fully encased within the chamber 13 so that even the rearmost element thereof does not extend into outside of the motor-glider.

Figure 5A:
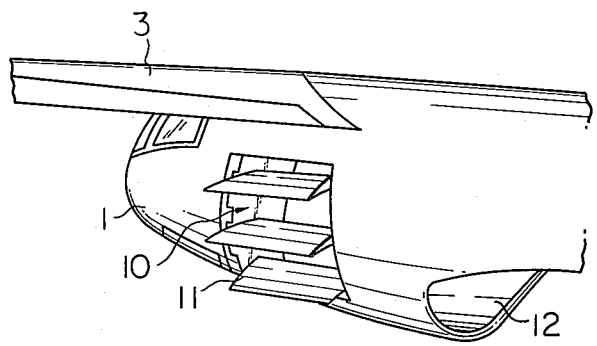
FIG. 5A is a rear perspective plan view of the fuselage and its related parts with the air-intake being in the open state.
Figure 6A:
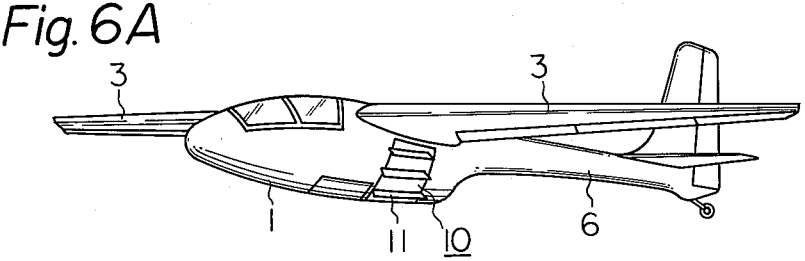
FIG. 6A is a three-quarter front perspective plan view of the motor-glider shown in FIG. 1 during powered flight.

In the condition shown in FIGS. 5A and 6A, i.e. during take-off and powered-off flight, the shutters 11 are turned up and out in order to keep the air-intake 10 in the open state. Upon running of the power system 20, outside air is taken into the chamber 13 through the air-intake 10 and ejected rearwardly and downwardly out of the chamber 13 through the outlet 12, thereby providing propelling force to the motor-glider.

Figure 5B:
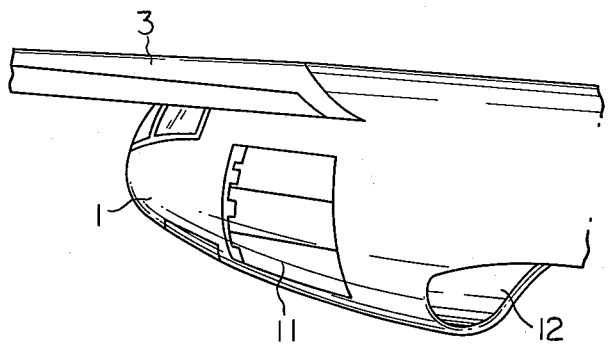
FIG. 5B is a similar view but with the air-intake in the closed state.
Figure 6B:
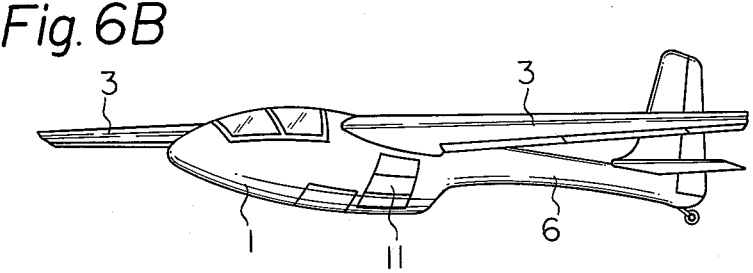
FIG. 6B is a similar view but during power-off gliding.

In the condition shown in FIGS. 5B and 6B, i.e. during power-off gliding, the shutters 11 are turned down in order to close the air-intake 10. The outer shape of the shutters 11 are so designed that, in the closed state, the outer surfaces of the shutters 11 are flush with the streamlined outer surface of the fuselage 1. Thus, presence of the shutters 11 in the closed state does not alter the streamlined shape of the fuselage 1.

Figure 7A:
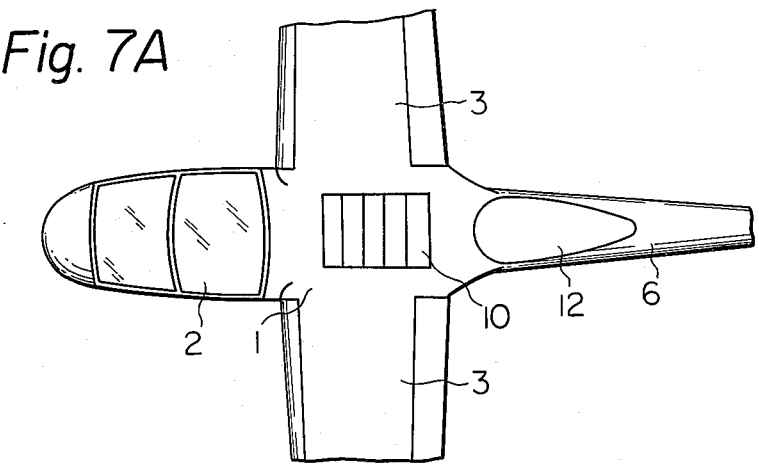
FIG. 7A is a top plan view of another embodiment of the motor-glider in accordance with the present invention with portions of the wings omitted.
Figure 7B:
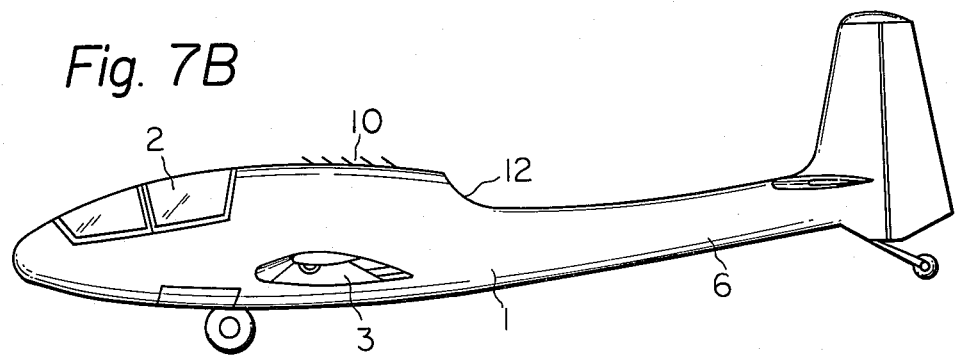
FIG. 7B is a side elevational view of the motor-glider shown in FIG. 7A with the air-intake in the open state.

A modified embodiment of the motor-glider in accordance with the present invention is shown in FIGS. 7A and 7B, in which the outlet 12 is formed on the upper side of the motor-glider behind the cockpit 2 so that the air in the chamber 13 is ejected rearwardly and upwardly through the outlet 12. In this case, the trailing top of the fuselage 1 is scooped about at the border between the fuselage 1 and the tail boom 6. In the embodiment of FIGS. 7A and 7B, the air-intake 10 is formed atop the fuselage 1 at a position forwardly of the outlet 12.

Figure 8:
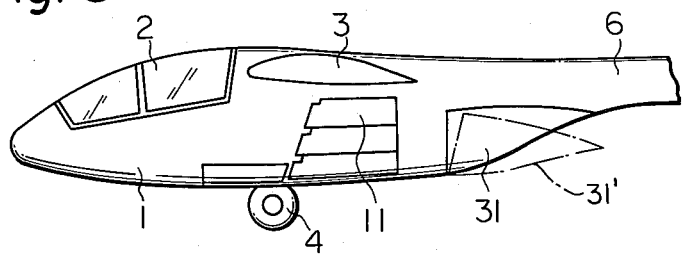
FIG. 8 is a side elevational view of the other embodiment of the motor-glider in accordance with the present invention and with a rear portion thereof omitted.

Another modification of the power-glider in accordance with the present invention is shown in FIG. 8, in which the outlet 12 is accompanied with a door 31 which is hinged at its front bottom to the framework of the fuselage 1, the hinge line extending substantially normal to the longitudinal axis of the motor-glider. The outer surface of the door 31 is designed to be flush with the streamlined outer surfaces of the fuselage 1 and the tail boom 6. As a result, in the closed state, the presence of the door 31 does not alter the streamlined shape of the motor-glider. During take-off and power flight, the door 31 is lowered to the open position as shown with chain-dot lines in order to allow smooth ejection of air through the outlet 12. Whereas, during power-off gliding, the door 31 is raised to the closed position as shown with solid lines in order to minimize aerodynamic drag acting on the motor-glider.

Figure 9A:
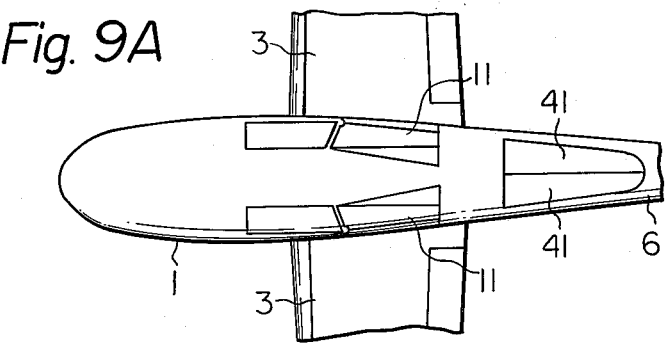
FIGS. 9A and 9B are partial bottom plan views of a further embodiment of the motor-glider in accordance with the present invention.
Figure 9B:
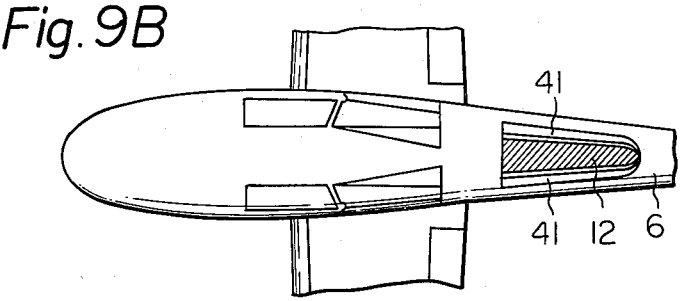

The other embodiment of the motor-glider in accordance with the present invention is shown in FIGS. 9A and 9B, in which the outlet 12 is selectively opened by means of a pair of coactable doors 41, each being hinged at the lateral side thereof to the framework of the fuselage 1. The hinge lines run in the longitudinal direction of the motor-glider. The doors 41 are so designed that, when closed, their outer surfaces are flush with the streamlined outer surface of the fuselage 1.

In the position shown in FIG. 9A, i.e. during power-off gliding, the doors 41 cover and close the outlet 12, thereby minimizing aerodynamic drag acting on the motor-glider. Whereas, in the condition shown in FIG. 9B, i.e. during take-off and power flight, the doors 41 are turned down in order to open the outlet 12, thereby allowing ejection of air for propelling the glider.

Figure 10:
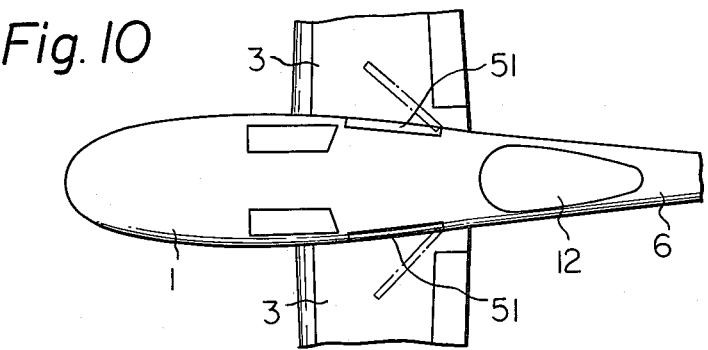
FIG. 10 is a partial bottom plan view of a still further embodiment of the motor-glider in accordance with the present invention.

A further embodiment of the motor-glider in accordance with the present invention is shown in FIG. 10, in which the air-intakes each include a shutter 51 hinged at the rear side to the framework of the fuselage 1, the hinge line extending substantially in the vertical direction. The shutters 51 are so designed that their outer surfaces are flush with the streamlined outer surface of the fuselage 1.

During power-off gliding, the shutters 51 are turned in as shown by solid lines in order to minimize aerodynamic drag acting on the motor-glider. Whereas, during take-off and power-flight, the doors 51 are turned out as shown with chain-dot lines 51' in order to allow ejection of air through the outlet 12, thereby providing propelling force.

In order to confirm the advantageous aerodynamic characteristics of the motor-glider in accordance with the present invention over that of conventional motor-gliders, a constrast was made to glide ratios of the two.

A result of the analysis conducted by the inventors of the present invention is given in the form of a polar curve graph shown in FIG. 11, in which the lift coefficient CL is plotted along the ordinate, the drag coefficient CD is plotted on the abscissa and characteristic curves A, B and C are given for angles of attack of, say, every 4° interval.

An angle of attack is a term meaning a crossing angle of a relative wind with the longitudinal axis of the motor-glider in question. A glide ratio is given in the form of a ratio of a lift coefficient CL with respect to the corresponding drag coefficient CD, and equal to a ratio of a horizontal distance (or speed) of flight with respect to the corresponding vertical distance (or speed) of descendent. Thus, the larger the valve of the glide ratio of a glider, the better the aerodynamic characteristics of the glider. The data given in the graph are on the basis of wind tunnel tests using model gliders.

In the polar curve graph, the curve A corresponds to power-off gliding of the motor-glider in accordance with the present invention, the air-intake 10 and the outlet 12 being both closed. In other words, the curve A corresponds to usual gliding operation of the conventional glider of same outer shape. (see FIG. 6B)

The curve B corresponds to powered flight of the motorglider in accordance with the present invention, the air intake 10 and the outlet 12 being both open. (see FIG. 6A)

The curve C corresponds to take-off of the motor-glider in accordance with the present invention, the air intake 10 and the outlet 12 being open and the landing gear system 4 projecting out of the fuselage 1.

In the case of a conventional motor-glider provided with a propeller power system on the nose cone side, the propeller power system and the shutters for the air-intake are both exposed outside the fuselage even during power-off gliding and, therefore, aerodynamic drag acting on the motor-glider is very large. Even in the case of a conventional motor-glider in which the propeller power system is fully encased within the fuselage and the air-intake is formed in the nose cone quite like jet aircrafts, it is almost impossible to deform the air-intake and its related parts so as to closely conform to the streamlined outer shape of the fuselage during power-off gliding, aerodynamic drag acting on the motor-glider cannot be reduced.

For these reasons, it is clear that characteristic curves for conventional motor-gliders fall on the right side of the curve A in the polar curve graph in FIG. 11.

It will be well understood also that the maximum glide ratio (CL/CD) of the motor-glider in accordance with the present invention is obtained at a point E on the curve A, at which the tangential line D passing through the zero point should be in contact with the curve A. Now it is assumed that another polar curve P should correspond to a certain type of conventional motor glider. As already explained, this curve P naturally falls on the right side of the polar curve A for the motor-glider in accordance with the present invention. The maximum glide ratio (CL/CD) of this conventional motor-glider is obtained at a point R on the curve P, at which the tangential line Q passing through the zero point should be in contact with the curve P.

Thus, the maximum glide ratio (CL/CD) of the motor-glider in accordance with the present invention is given in the form of the tangent of the line D and, likewise, that of the conventional motor-glider is given in the form of the tangent of the line Q. Needless to say, the former tangent value is larger than the latter tangent value as the gradient of the line D is clearly larger than that of the line Q. In other words, the maximum glide ratio of the motor-glider in accordance with the present invention is larger than those of any conventional motor-gliders. That is, the gliding characteristics of the motor-glider in accordance with the present invention is by far superior to those of any conventional motor-gliders.

Through employment of the present invention in the construction of a motor-glider, the following advantages should be resulted.

As the elements relating to the propeller power system are all fully encased within the fuselage when required without any disorder to the streamlined outer shape of the motor-glider, aerodynamic drag acting on the motor-glider can be considerably minimized.

As the propeller power system is fixed mounted to and fully encased within the fuselage at a position close to the center of gravity of the motor-glider, posture of the motor-glider during flight and gliding can be extremely well stabilized.

As the thrust line of the propeller power system is substantially in line with the longitudinal axis of the motor-glider, there is no harmful influence upon the gliding characteristics of the motor-glider which should otherwise be caused by a gap between the two.

As the outlet opens in the rearward and downward or rearward and upward direction with respect to the longitudinal axis of the motor-glider, the air ejected by the propeller power system flows in directions away from the tail boom, thereby minimizing aerodynamic drag to act on the tail boom, i.e. the motor-glider.

What is claimed is:

1. An improved motor-glider comprising:

a fuselage provided with wings and a retractable landing gear system;

a tail boom extending rearwardly and forming an integral part of said fuselage and provided with vertical and horizontal tails;

a propeller power system fully encased within a chamber formed in the rear bottom portion of said fuselage, said propeller power system including a tail cone facing an outlet formed in the rear end of said fuselage and rearwardly of and in communication with said chamber, and supported by the inner wall of said chamber via stators, a ducted propeller fan rotatably supported by said inner wall by struts on the front side of said chamber and an internal combustion engine supported by frameworks in said chamber and having a rearwardly extending drive means coupled to said ducted propeller fan for rotation of said propeller fan; and air-intakes located on both sides of said fuselage forwardly of said power system and opening into said chamber and being covered by selectively openable shutters whose outer surfaces in the closed state are flush with the streamlined outer surface of said fuselage.

2. An improved motor-glider as claimed in claim 1 in which said propeller power system is located at a position close to the center of gravity of said motor-glider.

3. An improved motor-glider as claimed in claim 1 in which said struts are adapted to operate as guide vanes and are supported by a cylinder fixed to said inner wall of said chamber.

4. An improved motor-glider as claimed in claim 1 in which the drive means of said internal combustion engine coupling the engine to said ducted propeller fan comprises a flexible coupling assembly.

5. An improved motor-glider as claimed in claim 1 in which said chamber is isolated from the surrounding inner space of said motor-glider by a bulkhead and a top duct board.

6. An improved motor-glider as claimed in claim 1 in which said shutters are of a Venetian-blind-type and their hinge lines extend substantially parallel to the longitudinal axis of said motor-glider.

7. An improved motor-glider as claimed in claim 1 in which said shutters are hinged to frameworks of said fuselage on their rear sides and their hinge lines extend substantially vertically.

8. An improved motor-glider as claimed in claim 1 in which said outlet opens rearwardly and downwardly.

9. An improved motor-glider as claimed in claim 1 in which said outlet opens rearwardly and upwardly.

10. An improved motor-glider as claimed in claim 1 further comprising means for selectively closing said outlet.

11. An improved motor-glider as claimed in claim 10 in which said closing means includes a door hinged at the front bottom side thereof to the framework of said fuselage, the hinge line extending substantially normal to the longitudinal axis of said motor-glider and the outer surface of said door in the closed state being flush with the streamlined outer surfaces of said fuselage and said tail boom.

12. An improved motor-glider as claimed in claim 10 in which said closing means includes a pair of coacting doors hinged at the upper sides thereof to frameworks of said fuselage, the hinge lines extending substantially parallel to the longitudinal axis of said motor glider and the outer surfaces of said doors in the closed state being flush with the streamlined outer surfaces of said fuselage and said tail boom.

* * * * *